United States Patent
You

(10) Patent No.: US 10,686,566 B2
(45) Date of Patent: Jun. 16, 2020

(54) METHOD FOR TRANSMISSION AND RECEPTION BASED ON HYBRID AUTOMATIC REPEAT REQUEST IN COMMUNICATION SYSTEM AND APPARATUS FOR THE SAME

(71) Applicant: ELECTRONICS AND TELECOMMUNICATIONS RESEARCH INSTITUTE, Daejeon (KR)

(72) Inventor: Duk Hyun You, Daejeon (KR)

(73) Assignee: Electronic and Telecommunications Research Institute, Daejeon (KR)

( * ) Notice: Subject to any disclaimer, the term of this patent is extended or adjusted under 35 U.S.C. 154(b) by 14 days.

(21) Appl. No.: 16/264,577

(22) Filed: Jan. 31, 2019

(65) Prior Publication Data
US 2019/0334661 A1    Oct. 31, 2019

(30) Foreign Application Priority Data

Apr. 27, 2018   (KR) .................. 10-2018-0049346

(51) Int. Cl.
*H04L 1/18*    (2006.01)

(52) U.S. Cl.
CPC .......... *H04L 1/1845* (2013.01); *H04L 1/1812* (2013.01); *H04L 1/1861* (2013.01)

(58) Field of Classification Search
CPC .... H04L 1/1845; H04L 1/1812; H04L 1/1861
See application file for complete search history.

(56) References Cited

U.S. PATENT DOCUMENTS

| | | | | |
|---|---|---|---|---|
| 8,397,150 | B1* | 3/2013 | Nieminen | ......... H03M 13/4107 375/262 |
| 8,699,601 | B1* | 4/2014 | Lee | ...................... H04L 1/0054 370/203 |
| 8,873,671 | B2 | 10/2014 | Sampath et al. | |
| 8,891,466 | B2* | 11/2014 | Hsieh | .................... H04L 1/1812 370/329 |
| 9,292,375 | B2 | 3/2016 | Hong | |
| 9,480,048 | B2* | 10/2016 | Earnshaw | ............. H04L 1/1812 |

(Continued)

OTHER PUBLICATIONS

Matteo Danieli et al., "Maximum Mutual Information Vector Quantization of Log-Likelihood Ratios for Memory Efficient HARQ Implementations", 2010 Data Compression Conference, Mar. 24-26, 2010, pp. 30-39, DOI: 10.1109/DCC.2010.98.

*Primary Examiner* — Edan Orgad
*Assistant Examiner* — Malick A Sohrab
(74) *Attorney, Agent, or Firm* — Rabin & Berdo, P.C.

(57) ABSTRACT

Provided are a method and an apparatus for transmission and reception based on hybrid automatic repeat request in a communication system. A first communication node includes a coherent channel region (CCR) mapper configured to determine W representative soft bit values for each CCR on the basis of X original soft bit values of signals and determine a sign sequence of the X original soft bit values, and a CCR demapper configured to restore X soft bit values for each CCR using W representative soft bit values and a sign sequence. Since the CCR mapper compresses soft bits using channel coherency, a hybrid automatic repeat request (HARQ) buffer size is reduced compared to that of an existing method. Therefore, performance of a communication system may be improved.

20 Claims, 9 Drawing Sheets

(56) References Cited

U.S. PATENT DOCUMENTS

| | | |
|---|---|---|
| 9,674,845 B2 | 6/2017 | Chen et al. |
| 9,893,865 B2 * | 2/2018 | Hsieh .................... H04L 5/0055 |
| 10,257,818 B2 * | 4/2019 | Oketani ................ H04W 28/04 |
| 2010/0088578 A1 * | 4/2010 | Kamuf .................. H04L 1/0045 |
| | | 714/780 |
| 2011/0145669 A1 | 6/2011 | Kim et al. |
| 2013/0070828 A1 * | 3/2013 | Das ........................ H04L 27/22 |
| | | 375/226 |
| 2018/0159611 A1 * | 6/2018 | Majmundar ............ H04L 47/38 |
| 2018/0262299 A1 * | 9/2018 | Gho ..................... H04L 1/0045 |

* cited by examiner (M=6,N=2,Moffset=0,Noffset=0)

☐ : CCR

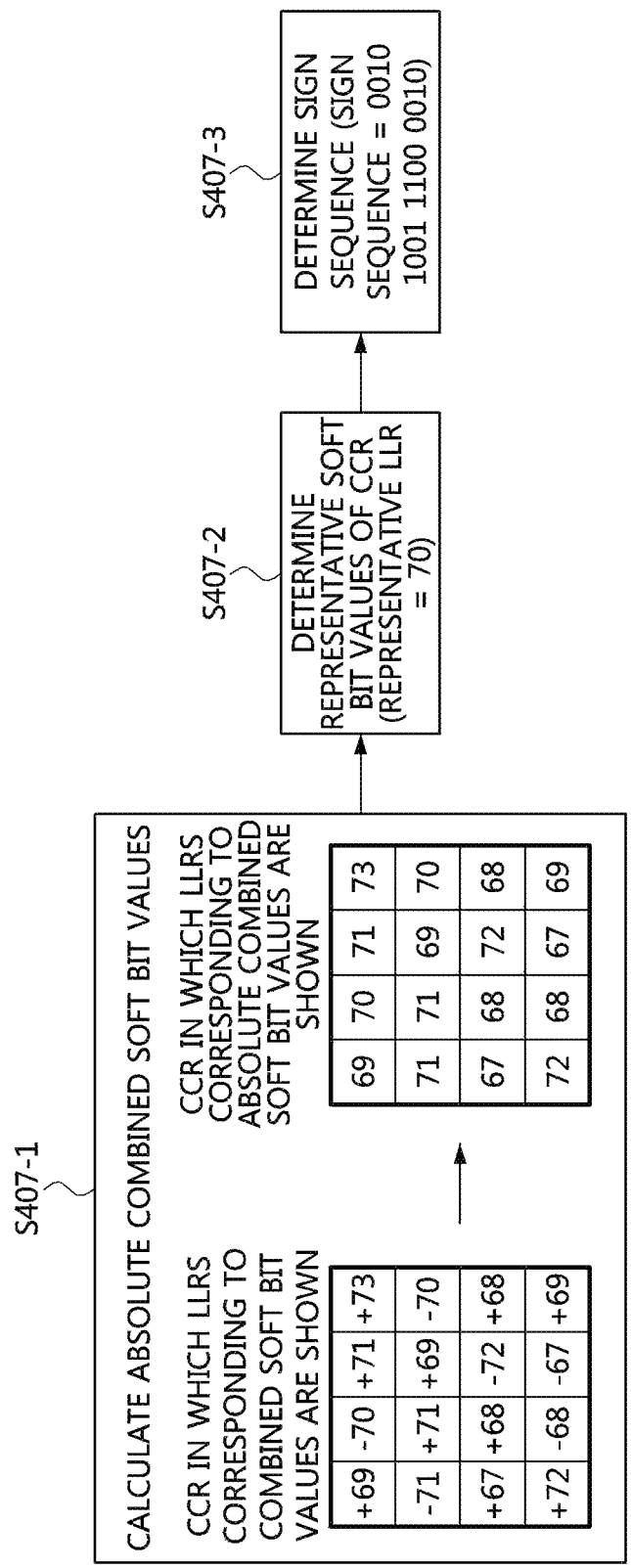

METHOD FOR TRANSMISSION AND RECEPTION BASED ON HYBRID AUTOMATIC REPEAT REQUEST IN COMMUNICATION SYSTEM AND APPARATUS FOR THE SAME

CLAIM FOR PRIORITY

This application claims priority to Korean Patent Application No. 2018-0049346 filed on Apr. 27, 2018 in the Korean Intellectual Property Office (KIPO), the entire contents of which are hereby incorporated by reference.

BACKGROUND

1. Technical Field

Example embodiments of the present invention relate to a hybrid automatic repeat request (HARQ) technology in a communication system, and more particularly, to a HARQ-based transmission and reception technology for satisfying the requirements of high data throughput, low latency, and high reliability, and more particularly.

2. Related Art

In a communication system, a data packet may be transmitted from a transmitter (e.g., a base station) to a receiver (e.g., a terminal) through a wireless channel. An error may occur in the data packet received by the receiver according to status of the wireless channel (e.g., a change in quality of the wireless channel). To correct a receiving error, a forward error correction (FEC) technique may be used. When the FEC technique is used in the communication system, the transmitter may transmit a data packet including redundancy. When there is an error in a received data packet, the receiver may correct the error using the redundancy.

Also, an automatic repeat request (ARQ) technique may be used to correct a receiving error. When the ARQ technique is used in the communication system, the transmitter may transmit a data packet including a cyclic redundancy check (CRC) value, and the receiver may determine whether there is an error on the basis of the CRC value included in the received data packet. When there is no error in the received data packet, the receiver may transmit an acknowledgement (ACK) to the transmitter. On the other hand, when there is an error in the received data packet, the receiver may transmit a negative ACK (NACK) to the transmitter. The transmitter which has received the NACK may retransmit the data packet to the receiver.

Further, a Hybrid automatic repeat request (HARQ) technique which is a combination of the FEC technology and the ARQ technology may be used in the communication system. A HARQ retransmission procedure may be performed on the basis of chase combining (CC) or incremental redundancy (IR). When a CC HARQ retransmission procedure is performed, the transmitter may repeatedly transmit the same data packet. In this case, the receiver may decode the data packet by combining received identical data packets. When an IR HARQ retransmission procedure is performed, the transmitter may transmit data packets having different redundancy versions (RVs). The receiver may decode a data packet by combining the received data packets having different RVs.

Meanwhile, when a HARQ retransmission procedure is performed, a transport block (TB) corresponding to a HARQ process identifier (ID) may be stored in a HARQ memory (e.g., a HARQ buffer). In the communication system, the size of the HARQ memory may be increased to meet the requirement of high data throughput. However, when the size of the HARQ memory increases, the requirement of low latency may not be satisfied. Therefore, a HARQ technique for simultaneously satisfying the requirements of high data throughput and low latency.

SUMMARY

Accordingly, example embodiments of the present invention are provided to substantially obviate one or more problems due to limitations and disadvantages of the related art.

Example embodiments of the present invention provide a hybrid automatic repeat request (HARQ)-based transmission and reception apparatus and method for satisfying the requirements of high data throughput, low latency, and high reliability.

Some example embodiments provide a first communication node including: a demodulator configured to perform a demodulation operation on a signal received from a second communication node and output G original soft bit values; a rate dematcher configured to output K combined soft bit values by combining G' restored soft bit values and the G original soft bit values; a coherent channel region (CCR) mapper configured to set a region corresponding to M×N consecutive resource elements (REs) to a CCR in a resource grid (RG), acquire P×Q combined soft bit values mapped to the CCR among the K combined soft bit values, determine W representative soft bit values for each CCR on the basis of combined soft bit values mapped to the CCR, and determine a sign sequence of P×Q combined soft bit values for each CCR; a HARQ buffer configured to store the W representative soft bit values and the sign sequence determined by the CCR mapper; a CCR demapper configured to output final soft bit values by restoring P×Q soft bit values for each CCR with the W representative soft bit values and the sign sequence stored in the HARQ buffer; and a decoder configured to perform a decoding operation on the final soft bit values.

Here, G may indicate the number of currently received soft bits, M may indicate the size of a frequency region of a CCR in the RG, N may indicate the size of a time region of a CCR in the RG, P may indicate the number of REs to which data is mapped in a CCR configured with M×N REs, Q may indicate the number of bits mapped to one RE in a CCR according to a modulation scheme, W may indicate the number of representative soft bit values in a CCR, G' may indicate the number of previously received soft bits (i.e., the number of soft bits stored in the HARQ buffer), and K may indicate the number of combined soft bits. Each of M, N, P, Q, W, G', and K may be an integer which is greater than or equal to 1.

Absolute values of the P×Q soft bit values may be identical to the W representative soft bit values.

In general, G original soft bit values may be output in a data mapping sequence defined in a standard. For example, in the case of long term evolution (LTE), bit values may be mapped to a frequency axis in a time region # n (e.g., symbol # n). When mapping to the frequency axis is finished in the time region # n, bit values may be mapped to the frequency axis in the next time region #(n+1). Such an arrangement method of soft bit values may be defined as an "arrangement method based on a data mapping sequence." Also, an arrangement method in which G original soft bit values are arranged to neighbor values belonging to a region set to one CCR may be defined as an "arrangement method based on a CCR mapping sequence." Here, the sequence of the G original soft bit values may differ from the CCR mapping sequence. In this case, the CCR mapper may arrange outputs in the CCR mapping sequence.

When the sequence of the original soft bit values differs from the CCR mapping sequence, the CCR demapper may arrange outputs in a data mapping sequence. The P×Q combined soft bit values may be combined soft bit values of symbols received through a CCR composed of M×N consecutive REs in the RG, and the CCR may include the consecutive REs whose channel characteristic is changed within a predefined range.

A boundary of the CCR may be a point at which a difference between combined soft bit values of symbols received from REs neighboring each other is a predefined threshold value or higher. Also, the CCR may be composed of REs to which symbols having soft bit values having an autocorrelation value of a predefined threshold value or higher are mapped.

Since an arrangement interval of reference signals is generally determined on the basis of an autocorrelation value in a standard, the frequency region of a CCR may be determined on the basis of an interval between reference signals in the frequency axis, and the time region of a CCR may be determined on the basis of an interval between reference signals in the time axis.

The CCR may be set in the RG, and one or more CCRs may be set in the RG.

Other example embodiments provide an operating method of a first communication node including: generating G original soft bit values of a signal received from a second communication node by performing a demodulation operation on the signal; restoring G' soft bit values by performing CCR demapping on the basis of representative soft bit values and a sign sequence of existing data stored in a HARQ buffer; outputting K combined soft bit values by combining the G original soft bit values and the G' restored soft bit values; setting CCRs composed of M×N consecutive REs in an RG on the basis of the K combined soft bit values; determining W representative soft bit values for each CCR on the basis of combined soft bit values of P×Q REs belonging to the CCR; determining a sign sequence of P×Q combined soft bit values for each CCR; and performing a decoding operation on K combined soft bit values. Each of G, G', M, N, P, Q, W, and K is an integer greater than or equal to 1.

Here, absolute values of the P×Q soft bit values may be identical to the W representative soft bit values.

A sequence of the G original soft bit values may differ from a CCR mapping sequence.

The operating method of the first communication node may further include, when a sequence of original soft bit values differs from a CCR mapping sequence, arranging, by a CCR demapper, the G' restored soft bit values in a data mapping sequence, and arranging, by a CCR mapper, the K combined soft bit values in a CCR mapping sequence.

The performing of the decoding operation may include performing a decoding operation on the K soft bit values arranged in the data mapping sequence.

The P×Q combined soft bit values may be combined soft bit values of symbols received through a CCR composed of M×N consecutive REs in the RG, and the CCR may include the consecutive REs whose channel characteristic is changed within a predefined range.

A boundary of the CCR may be a point at which a difference between combined soft bit values of symbols received from REs neighboring each other is a predefined threshold value or higher. Also, the CCR may be composed of REs to which symbols having soft bit values having an autocorrelation value of a predefined threshold value or higher are mapped.

Since an arrangement interval of reference signals is generally determined on the basis of an autocorrelation value in a standard, the frequency region of a CCR may be determined on the basis of an interval between reference signals in the frequency axis, and the time region of a CCR may be determined on the basis of an interval between reference signals in the time axis.

The CCR may be set in the RG, and one or more CCRs may be set in the RG.

BRIEF DESCRIPTION OF DRAWINGS

Example embodiments of the present invention will become more apparent by describing in detail example embodiments of the present invention with reference to the accompanying drawings, in which:

FIG. 7 is a conceptual diagram showing a first example embodiment of a method of setting representative soft bit values.

DESCRIPTION OF EXAMPLE EMBODIMENTS

Figure 1:
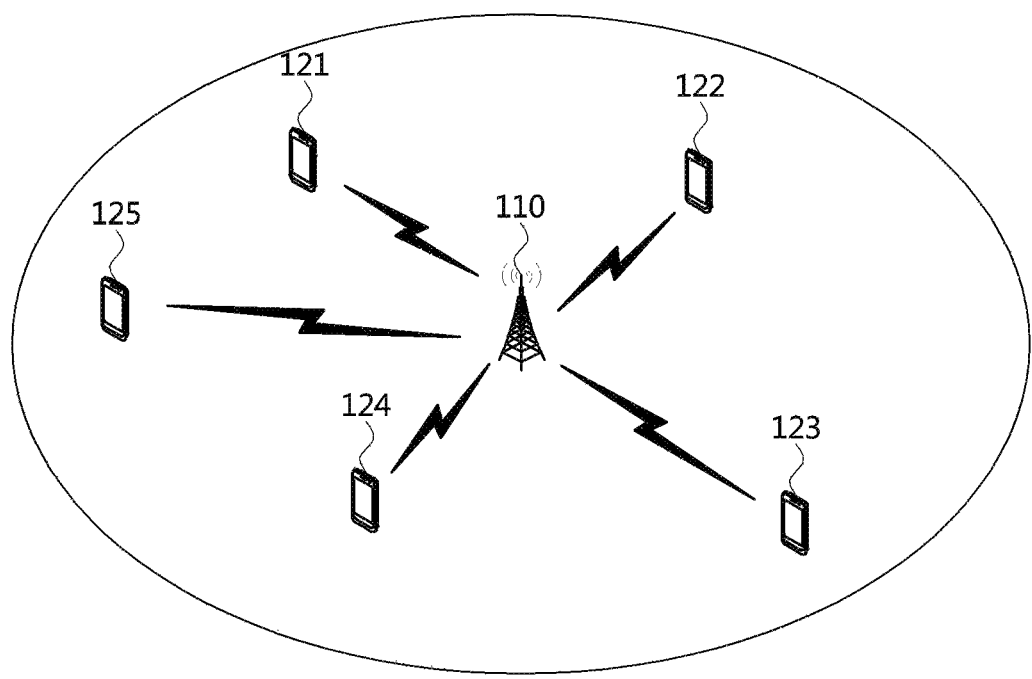
FIG. 1 is a conceptual diagram showing a first example embodiment of a communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which example embodiments of the present invention are applied will be described. The communication system to which example embodiments of the present invention are applied is not limited to the following description, and example embodiments of the present invention may be applied to various communication systems. Here, the communication system may be used in the same meaning as a communication network.

FIG. 1 is a conceptual diagram showing a first example embodiment of a communication system.

Referring to FIG. 1, a communication system 100 may include one or more communication nodes 110, 121, 122, 123, 124, and 125. Additionally, the communication system 100 may include a core network (e.g., serving-gateway (S-GW)), a packet data network (PDN)-gateway (P-GW), and a mobility management entity (MME). The one or more communication nodes may support 4th generation (4G) communication (e.g., long term evolution (LTE) and LTE-advanced (LTE-A)), 5th generation (5G) communication (e.g., new radio (NR) communication), and the like. When the communication system 100 is a 5G communication system, the core network may include an access and mobility management function (AMF), a user plane function (UPF), a session management function (SMF), and the like.

For example, the one or more communication nodes may support a code division multiple access (CDMA)-based communication protocol, a wideband CDMA (WCDMA)-based communication protocol, a time division multiple access (TDMA)-based communication protocol, a frequency division multiple access (FDMA)-based communication protocol, an orthogonal frequency division multiplexing (OFDM)-based communication protocol, a filtered OFDM-based communication protocol, an orthogonal frequency division multiple access (OFDMA)-based communication protocol, a single carrier (SC) FDMA-based communication protocol, a non-orthogonal multiple access (NOMA)-based communication protocol, a generalized frequency division multiplexing (GFDM)-based communication protocol, a filter bank multi-carrier (FBMC)-based communication protocol, a universal filtered multi-carrier (UFMC)-based communication protocol, a space division multiple access (SDMA)-based communication protocol, and the like.

Each of the one or more communication nodes may have the following structure.

Figure 2:
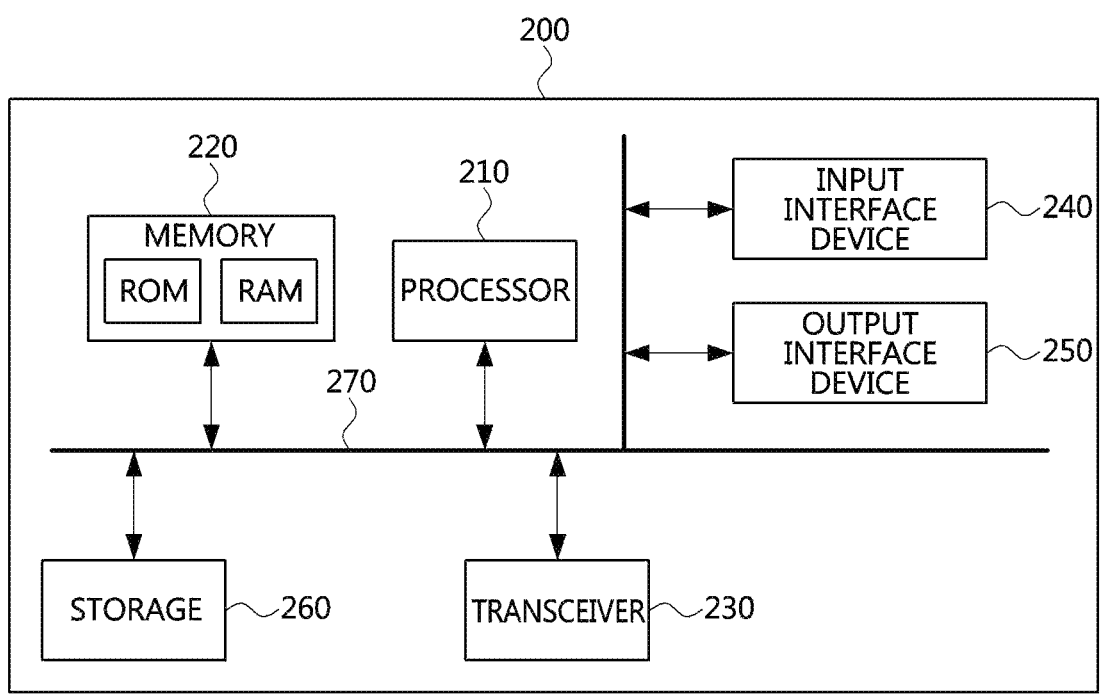
FIG. 2 is a block diagram showing a first example embodiment of a communication node constituting a communication system.

FIG. 2 is a block diagram showing a first example embodiment of a communication node constituting a communication system.

Referring to FIG. 2, a communication node 200 may include at least one processor 210, a memory 220, and a transceiver 230 which is connected to a network and performs communication. Additionally, the communication node 200 may include an input interface device 240, an output interface device 250, a storage 260, and the like. The individual components included in the communication node 200 may be connected via a bus 270 and communicate with each other.

However, the individual components included in the communication node 200 may not be connected via the common bus 270 but may rather be connected via individual interfaces or individual buses centering on the processor 210. For example, the processor 210 may be connected to at least one of the memory 220, the transceiver 230, the input interface device 240, the output interface device 250, and the storage 260 via a dedicated interface.

The processor 210 may execute a program command stored in at least one of the memory 220 and the storage 260. The processor 210 may be a central processing unit (CPU), a graphics processing unit (GPU), or a dedicated processor by which methods according to example embodiments of the present invention are performed. Each of the memory 220 and the storage 260 may be composed of at least one of a volatile storage medium and a non-volatile storage medium. For example, the memory 220 may be composed of at least one of a read only memory (ROM) and a random access memory (RAM).

Referring back to FIG. 1, in the communication system 100, a base station 110 may form a macro-cell or a small cell and may be connected to the core network through an ideal backhaul or a non-ideal backhaul. The base station 110 may transmit a signal received from the core network to the corresponding terminal 121, 122, 123, 124, or 125 and transmit a signal received from the corresponding terminal 121, 122, 123, 124, or 125 to the core network. The one or more terminals 121, 122, 123, 124, and 125 may be within a cell coverage of the base station 110. The one or more terminals 121, 122, 123, 124, and 125 may be connected to the base station 110 by performing a connection establishment procedure with the base station 110. After connected to the base station 110, the one or more terminals 121, 122, 123, 124, and 125 may communicate with the base station 110.

The base station 110 may support a multiple input multiple output (MIMO) transmission (e.g., single user (SU)-MIMO, multi-user (MU)-MIMO, and massive MIMO), coordinated multipoint (CoMP) transmission, carrier aggregation (CA) transmission, unlicensed band transmission, device to device (D2D) communication (or proximity services (ProSe)), and the like. Each of the one or more terminals 121, 122, 123, 124, and 125 may perform an operation corresponding to the base station 110, an operation supported by the base station 110, and the like.

The base station 110 may be referred to as a nodeB, an evolved nodeB (eNB), a next generation nodeB (gNB), a base transceiver station (BTS), a radio remote head (RRH), a transmission reception point (TRP), a radio unit (RU), a road side unit (RSU), a radio transceiver, an access point, an access node, and the like. Each of the one or more terminals 121, 122, 123, 124, and 125 may be referred to as user equipment (UE), an access terminal, a mobile terminal, a station, a subscriber station, a mobile station, a portable subscriber station, a node, a device, an on-board unit (OBU), and the like.

Next, hybrid automatic repeat request (HARQ)-based transmission and reception methods in a communication system will be described. While a method (e.g., a transmission or reception method of a data packet) performed by a first communication node among communication nodes is described, a second communication node corresponding to the first communication node may perform a method (e.g., a reception or transmission method of the data packet) corresponding to the method performed by the first communication node. In other words, when an operation of a terminal is described, a base station corresponding to the terminal may perform an operation corresponding to the operation of the terminal. Likewise, when an operation of a base station is described, a terminal corresponding to the base station may perform an operation corresponding to the operation of the base station.

The requirements of high data throughput, low latency, and high reliability may be supported by a communication system (e.g., a time division duplex (TDD)-based communication system). To support the requirement of high data throughput, the size of a transport block (TB) may be increased, and a HARQ buffer having a large size (hereinafter, large HARQ buffer) may be required accordingly.

The complexity of circuitry in a communication node may be increased by the large HARQ buffer, and thus it may be difficult to speed up the circuitry. Also, since there is a limit to increase a clock, the requirement of high data throughput may not be supported. Because the cost of a large HARQ buffer is relatively high, a large HARQ buffer may be unfavorable in terms of implementation cost.

The requirement of high data throughput may denote the requirements of low latency and high reliability. When a required data throughput (e.g., required quality of service (QoS)) is determined, a link having appropriate reliability may be formed in an initial transmission procedure and the probability of a receiving error may be minimized by improving the reliability of the link in every retransmission procedure. The requirement of low latency may be satisfied by such a transmission procedure. In other words, the requirements which are the reliability of the link and low latency caused by the retransmission procedure may be determined on the basis of the required QoS.

For example, in a 4G communication system, required QoS may be satisfied by requiring the reliability of an initial transmission procedure of "block error rate (BLER)=10%" and improving the reliability by combining TBs received in every retransmission procedure. Whether the required QoS is achieved may be determined by retransmission procedures rather than the initial transmission procedure. Therefore, retransmission procedures may require a link having high reliability to meet the requirement of high data throughput. In other words, it is necessary to meet the requirements of low latency and high reliability in order to satisfy the requirements of high data throughput. The requirements of low latency and high reliability may be satisfied when an error rate is smaller than an existing error rate in a retransmission procedure. In other words, the requirements of low latency and high reliability may be satisfied when HARQ performance is improved.

Meanwhile, in a TDD-based communication system, an uplink and a downlink are not able to coexist at the same time. Therefore, transmission of a HARQ response (e.g., an acknowledgement (ACK) or a negative ACK (NACK)) may be delayed. A HARQ procedure may be controlled by a decoder, and a retransmission procedure may be managed for each HARQ process identifier (ID) in units of TBs. When the transmission delay of a HARQ response increases, the number of HARQ process IDs increases, and thus a large HARQ buffer may be necessary. In other words, a HARQ buffer size required for a TDD-based communication system may be larger than a HARQ buffer size required for a frequency division duplex (FDD)-based communication system.

A TDD-based communication system may require a large HARQ buffer to meet the requirement of high data throughput, and the complexity and cost of implementation may be increased due to the large HARQ buffer. Also, the large HARQ buffer may make it difficult to speed up the circuitry. Therefore, it is necessary to minimize an increase in a HARQ buffer size. However, when a HARQ buffer size is reduced, an error rate of a retransmission procedure increases, and thus HARQ performance may be degraded. Consequently, there is a necessity for a technology for minimizing a HARQ buffer size while maintaining HARQ performance.

Meanwhile, a HARQ-based transmission and reception procedure may be performed in a communication system as follows.

Figure 3:
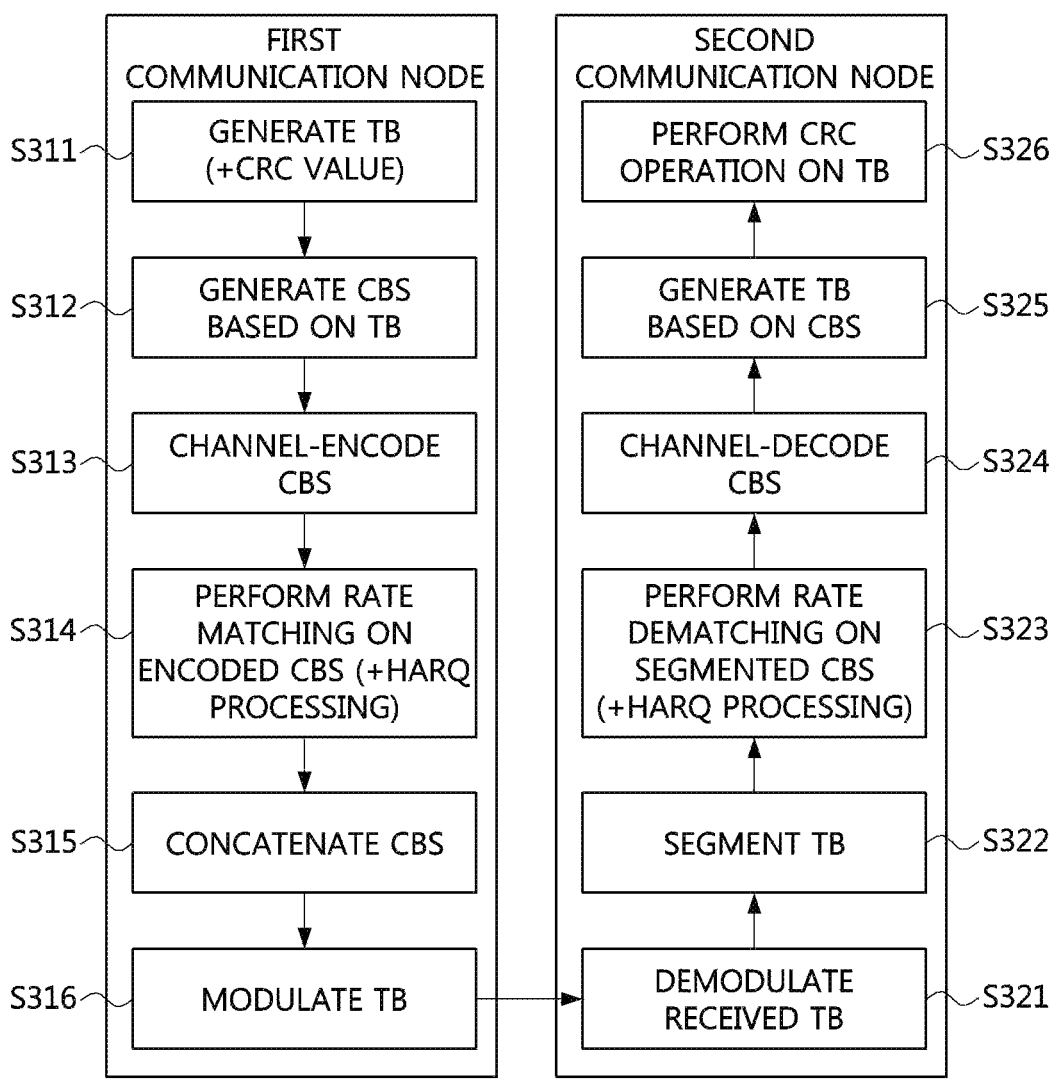
FIG. 3 is a flowchart showing a first example embodiment of a hybrid automatic repeat request (HARQ)-based transmission and reception procedure in a communication system.

FIG. 3 is a flowchart showing a first example embodiment of a HARQ-based transmission and reception procedure in a communication system.

Referring to FIG. 3, the HARQ-based transmission and reception procedure may be performed in units of TBs. A first communication node may be a transmitter which transmits a signal, and a second communication node may be a receiver which receives a signal. Each of the first and second communication nodes may be configured to be identical or similar to the communication node 200 shown in FIG. 2.

The first communication node may generate $b_o, b_1, \ldots, b_{B-1}$ by appending cyclic redundancy check (CRC) values to data (TBs) $a_o, a_1, \ldots, a_{A-1}$ (S311). The first communication node may generate one or more code blocks (CBs) by performing a segmentation operation on $b_o, b_1, \ldots, b_{B-1}$ and append a CRC value to each of the one or more CBs (S312). A total of C CBs may be generated, and $r^{th}$ CBs generated in operation S312 may be represented as "$c_0^{(r)}, c_1^{(r)}, \ldots, c_{(K_r-1)}^{(r)}$." For convenience of description below, a signal transmission operation will be described on the basis of only the $r^{th}$ CBs, but a channel encoding operation and a rate matching operation may be performed on all CBs.

The first communication node may perform a channel encoding operation on the $r^{th}$ CBs ($c_0^{(r)}, c_1^{(r)}, \ldots, c_{(K_r-1)}^{(r)}$) (S313). The $r^{th}$ CBs encoded in operation S313 may be represented as "$d_0^{(r)(i)}, d_1^{(r)(i)}, \ldots, d_{(D_r-1)}^{(r)(i)}$." When operation S313 is finished, the first communication node may perform a rate matching operation on the encoded $r^{th}$ CBs $d_0^{(r)(i)}, d_1^{(r)(i)}, \ldots, d_{(D_r-1)}^{(r)(i)}$ (S314). Also, in operation S314, the first communication node may perform a HARQ processing operation. The $r^{th}$ CBs generated in operation S314 may be represented as "$e_0^{(j)(r)}, e_1^{(j)(r)}, \ldots, e_{(E_r^{(j)}-1)}^{(j)(r)}$."

When operation S314 is finished, the first communication node may perform a concatenation operation on the rate-matched $r^{th}$ CBs ($e_0^{(j)(r)}, e_1^{(j)(r)}, \ldots, e_{(E_r^{(j)}-1)}^{(j)(r)}$) (S315), and concatenated CBs may be represented as "$g_0^{(j)}, g_1^{(j)}, \ldots, g_{(G^{(j)}-1)}^{(j)}$."

The first communication node may perform a modulation operation on the concatenated CBs (i.e., a codeword) (S316). The modulated signal ($h_0^{(j)}, h_1^{(j)}, \ldots, h_{(H^{(j)}-1)}^{(j)}$) may be transmitted from the first communication node to the second communication node through a channel.

Meanwhile, the second communication node may receive the signal ($h_0^{(j)}, h_1^{(j)}, \ldots, h_{(H^{(j)}-1)}^{(j)}$) from the first communication node and perform a demodulation operation on the received signal (($h_0^{(j)}, h_1^{(j)}, \ldots, h_{(H^{(j)}-1)}^{(j)}$) (S321), and the demodulated signal may be represented as "$(g_0^{(j)}, g_1^{(j)}, \ldots, g_{(G^{(j)}-1)}^{(j)}$." The second communication node may perform a segmentation operation on the demodulated signal (i.e., the codeword) (S322). In operation S322, C segmented CBs may be generated and segmented $r^{th}$ CBs may be represented as "$e_0^{(j)(r)}, e_1^{(j)(r)}, \ldots, e_{(E_r^{(j)}-1)}^{(j)(r)}$." Like the above-described signal transmission operation, for convenience of description, a signal transmission operation will be described on the basis of only the $r^{th}$ CBs, but a rate dematching operation and a channel decoding operation may be performed on all CBs. The second communication node may perform a rate dematching operation on the segmented $r^{th}$ CBs ($e_0^{(j)(r)}, e_1^{(j)(r)}, \ldots, e_{(E_r^{(j)}-1)}^{(j)(r)}$) (S323). Also, in operation S323, a HARQ processing operation may be performed. $r^{th}$ CBs generated in operation S323 may be represented as "$d_0^{(r)(i)}, d_1^{(r)(i)}, \ldots, d_{(D_r-1)}^{(r)(i)}$."

When operation S323 is finished, the second communication node may perform a channel decoding operation on the rate-dematched $r^{th}$ CBs ($d_0^{(r)(i)}, d_1^{(r)(i)}, \ldots, d_{(D_r-1)}^{(r)(i)}$) (S324). The decoded $r^{th}$ CBs may be represented as "$c_0^{(r)}, c_1^{(r)}, \ldots, c_{(K_r-1)}^{(r)}$." The second communication node may perform a CRC operation on the decoded CBs ($c_0^{(r)}, c_1^{(r)}, \ldots, c_{(K_r-1)}^{(r)}$) and perform a concatenation operation on the decoded $r^{th}$ CBs ($c_0^{(r)}, c_1^{(r)}, \ldots, c_{(K_r-1)}^{(r)}$) when the CRC operation is successfully finished (S325). CBs concatenated in operation S325 may be represented as $b_o, b_1, \ldots, b_{B-1}$. The second communication node may perform a CRC operation on $b_o, b_1, \ldots, b_{B-1}$ (S326). When the CRC operation on $b_o, b_1, \ldots, b_{B-1}$ is successfully finished, the second communication node may acquire the data (TB; $a_o, a_1, \ldots, a_{A-1}$) from $b_o, b_1, \ldots, b_{B-1}$.

Here, A, $G^{(j)}$, $N_L^{(j)}$), $Q_m^{(j)}$, $rv^{(j)}$ are generally given values and may be defined by Equation 1 below.

[Equation 1]

$$L_{TB} = const. \rightarrow B = A + L_{TB}) : TB\ CRC\ \text{Attachment}$$

$$\left. \begin{array}{l} L_{CB} = const. \\ Z = const. \end{array} \right] \rightarrow \left[ \begin{array}{l} C = \begin{cases} 1 & \text{if } (B \leq Z) \\ \left\lceil \dfrac{B}{Z - L_{CB}} \right\rceil & \text{otherwise} \end{cases} \\ B' = \begin{cases} B & \text{if } (B \leq Z) \\ B + CL_{CB} & \text{otherwise} \end{cases} \\ K_+ = \underset{K}{\mathrm{argmin}}\, K \geq \dfrac{B'}{C} \\ K_- = \underset{K}{\mathrm{argmin}}\, K < K_+ \\ C_- = \left\lfloor \dfrac{CK_+ - B'}{K_+ - K_-} \right\rfloor \end{array} \right] \rightarrow K_r = \begin{cases} K_- & \text{if } (r < C_-) \\ K_+ & \text{otherwise} \end{cases} \right\} : CB\ \text{Segmentation}$$

$$D_r = K_r + 4 \} \rightarrow \text{Channel Coding}$$

$$\left. \gamma = \dfrac{G^{(j)}}{N_L Q_m} \mathrm{mod}\, C \rightarrow E_r^{(j)} = \begin{cases} N_L Q_m \left\lceil \dfrac{G^{(j)}}{N_L Q_m C} \right\rceil & \text{if } (r \leq C - \gamma - 1) \\ N_L Q_m \left\lfloor \dfrac{G^{(j)}}{N_L Q_m C} \right\rfloor & \text{otherwise} \end{cases} \right\} : \text{Rate Matching } (@\ j\text{-}th\ \text{Transmission})$$

$$G^{(j)} = \sum_{r=0}^{C-1} E_r^{(j)} \bigg\} : CB\ \text{Concatenation } (@\ j\text{-}th\ \text{Transmission})$$

$$H^{(j)} = \sum_{r=0}^{C-1} \frac{E_r^{(j)}}{Q_m^{(j)}} \Bigg\} : \text{Modulation } (@\ j\text{-}th\ \text{Transmission})$$

$$R^{(j)} \propto \frac{A}{G^{(j)}} \leq 1 \Bigg\} : \text{Code Rate } (@\ j\text{-}th\ \text{Transmission})$$

$$G' = f_{HARQ}(G^{(j)}, rv^{(j)}) \propto \bigcup_{j, rv^{(j)}} G^{(j)} \leq \frac{A}{R_M} \Bigg\} : HARQ\ \text{Buffer Operation}$$

$$R_M \leq R_{\mathit{eff}} \propto \frac{A}{G'} \leq 1 \Bigg\} : \text{Effective Code Rate}$$

Meanwhile, a HARQ buffer size may be determined by a HARQ method. HARQ methods may be classified into chase combining (CC) or incremental redundancy (IR).

When CC is used, data transmitted in a retransmission procedure may be identical to data which has been transmitted in an initial transmission procedure, and HARQ performance may be acquired on the basis of a signal to noise ratio (SNR) gain which is generated by combining the data received in the initial transmission procedure and the data received in the retransmission procedure. Even when the retransmission procedure is performed, G of Equation 1 remains the same, and thus an effective code rate may not be changed. Therefore, a HARQ buffer size required for CC may be determined by Equation 2 below.

$$HARQ\ \text{buffer size} = \frac{\text{Transmission data size}}{\text{Code rate in initial transmission procedure}} \quad [\text{Equation 2}]$$

Here, G may be a HARQ buffer size. G may be a HARQ buffer size for one HARQ process ID (e.g., one TB). A HARQ buffer may be managed according to HARQ process IDs and managed according to TBs in the HARQ process IDs. A HARQ buffer size may be determined on the basis of "$N_{HARQ} \times N_{TB}$." $N_{HARQ}$ may indicate the maximum number of manageable HARQ process IDs, and $N_{TB}$ may indicate the maximum number of TBs which are transmittable in one HARQ process ID. Also, since TBs are stored in a HARQ buffer of the receiver as soft bit values (e.g., log likelihood ratios (LLRs)), a HARQ buffer size may be determined on the basis of "$N_{HARQ} \times N_{TB} \times B_{soft}$." $B_{soft}$ may indicate a soft bitwidth.

When IR is used, data transmitted in a retransmission procedure may differ from data transmitted in an initial transmission procedure, a low code rate may be acquired by combining the data received in the initial transmission procedure and the data received in the retransmission procedure, and HARQ performance may be acquired on the basis of a code rate gain. When the code rate is reduced, a receiving error rate is reduced. When an output of a mother code which has not been transmitted in a previous transmission procedure is transmitted in the retransmission procedure, the receiver may acquire a low code rate by combining data received in the previous transmission procedure and the data received in the retransmission procedure.

When IR is used, the receiver may receive all information generated by the mother code and acquire a low effective code rate due to the received all information. Therefore, HARQ performance may be improved by the low effective code rate. Here, an effective code rate may be calculated by dividing a transmission data size by all transmitted information. In other words, when a retransmission procedure is continuously performed, G of Equation 1 may be cumulatively increased, and an effective code rate may be reduced accordingly. A minimum effective code rate may be determined by a mother code rate. Therefore, a HARQ buffer size required for IR may be determined by Equation 3 below.

$$HARQ\ \text{buffer size} = \frac{\text{Transmission data size}}{\text{Minimum effective code rate}} \quad [\text{Equation 3}]$$

$$\left( = \frac{\text{Transmission data size}}{\text{Mother code rate}} \right)$$

Meanwhile, referring to Equation 4 below, a HARQ buffer size (G) may increase when A (i.e., transmission data) increases. When A increases in an initial transmission procedure, an initial code rate (i.e., $R_{init}$) may increase.

$$\max(G) \propto \begin{cases} \dfrac{A}{R_{init}}, & CC \\ \dfrac{A}{\min(R_{\mathit{eff}})}, & IR \end{cases} \quad [\text{Equation 4}]$$

Since $R_{init}$ is $\min(R_{\mathit{eff}})$ (i.e., a minimum effective code rate) or larger, a HARQ buffer size required for IR may be larger than a HARQ buffer size required for CC. For example, when $R_{init}$ is 1 and $\min(R_{\mathit{eff}})$ is ⅓, a HARQ buffer size required for IR may be three times that required for CC. Therefore, a HARQ buffer size may be determined on the basis of IR, and HARQ buffer optimization may be important in IR.

Meanwhile, limited buffer rate matching (LBRM) may be used to reduce a HARQ buffer size. In Equation 4, a HARQ buffer size may be proportional to A and inversely proportional to $\min(R_{\mathit{eff}})$. Since A is not determined in the physical (PHY) layer, $\min(R_{\mathit{eff}})$ may be set to be larger than the mother code rate (hereinafter, $R_M$) to reduce a HARQ buffer size in the aspect of the PHY layer. In LBRM, rate matching may be performed to satisfy "$\min(R_{\mathit{eff}}) > R_M$." On the other hand, in full buffer rate matching (FBRM), $\min(R_{\mathit{eff}})$ may be set to be identical to $R_M$.

$$\min(R_{\mathit{eff}}) = \begin{cases} R_M, & FBRM \\ R'_M = \alpha R_M\ (\alpha > 1), & LBRM \end{cases} \quad [\text{Equation 5}]$$

For example, $R_M$ may be ⅓ when FBRM is used in a 4G communication system, and $R_M$ may be ⅔ when LBRM is used in a 4G communication system. In this case, a HARQ buffer size for LBRM may be half a HARQ buffer size for FBRM.

$$\min(R_{\mathit{eff}}) = \begin{cases} R_M = \frac{1}{3}, & \text{FBRM} \\ R'_M = \frac{2}{3}, & \text{LBRM} \end{cases}$$ [Equation 6]

FBRM or MBRM may be used according to a UE category and a transmission data size. When a HARQ buffer size is set in units of CBs and is $K_w^{(r)}$ in FBRM, a value larger than $$\left\lfloor \frac{N_{IR}}{C} \right\rfloor$$

which is a maximum value determined by a UE category may not be used. Here, C may indicate the number of CB. $K_w^{(r)}$ may be determined by Equation 7 below and $N_{IR}$ may be determined by Equation 8 below. In Equation 7, $D_r$ may indicate the length of an $r^{th}$ CB encoded in operation S313 or the length of an $r^{th}$ CB generated in operation S323, and $C_{subblock}^{TC}$ may be the number of columns during sub-block interleaving after encoding. For example, $C_{subblock}^{TC}$ may be 32.

$$C_{subblock}^{TB} = const. \rightarrow K_\pi^{(r)} = \left\lfloor \frac{D_r}{C_{subblock}^{TB}} \right\rfloor C_{subblock}^{TB}:$$ [Equation 7]

subblock inverleaving $$K_w^{(r)} = \frac{K_\pi^{(r)}}{R_M}: \text{bitcollection}$$

$$N_{soft} = f(ue - \text{category}),$$ [Equation 8]
$$K_c = const. \geq 2, K_{MIMO} = const. \geq 1, M_{limit} = const.$$
$$N_{IR} = \left\lfloor \frac{N_{soft}}{K_C \cdot K_{MIMO} \cdot \min(M_{HARQ}, M_{limit})} \right\rfloor$$

When a maximum CB-specific HARQ buffer size is $N_{cb}^{(r)}$, $N_{cb}^{(r)}$ may be determined by Equation 9 below, and an overall HARQ buffer size may be determined by Equation 10 below.

$$N_{cb}^{(r)} = \begin{cases} \min\left(\left\lfloor \frac{N_{IR}}{C} \right\rfloor, K_w^{(r)}\right) & \text{downlink} \\ K_w^{(r)} & \text{uplink} \end{cases}$$ [Equation 9]

$$\max(G) \propto \sum_{r=}^{C-1} N_{cb}^{(r)}$$ [Equation 10]

When FBRM is used, a HARQ buffer size required for IR may be three times that required for CC. When LBRM is used, a HARQ buffer size required for IR may be 3/2 times that required for CC. Therefore, when LBRM is used instead of FBRM, a HARQ buffer size may be reduced.

Subsequently, a HARQ-based transmission and reception procedure for supporting a minimum HARQ buffer size may be performed in a communication system as follows.

Figure 4:
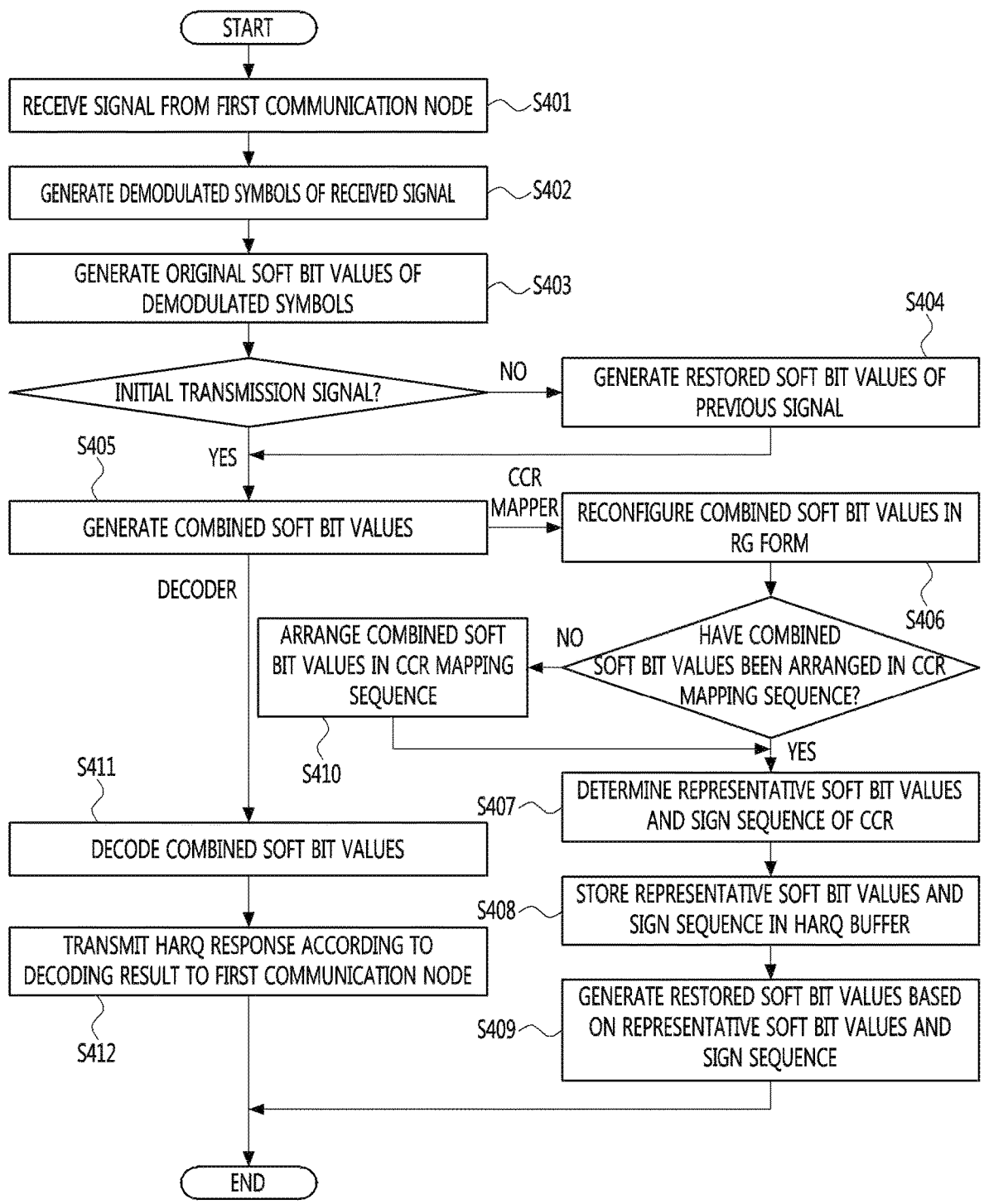
FIG. 4 is a flowchart showing a second example embodiment of a HARQ-based transmission and reception procedure in a communication system.

FIG. 4 is a flowchart showing a second example embodiment of a HARQ-based transmission and reception procedure in a communication system.

Referring to FIG. 4, a communication system may include a first communication node, a second communication node, and the like. The first communication node may be a transmitter which transmits a signal to the second communication node, and the second communication node may be a receiver which receives the signal from the first communication node. The first communication node may transmit a signal to the second communication node. The signal transmitted from the first communication node may be a signal generated according to operations S311 to S316 shown in FIG. 3. Each of the first communication node and the second communication node may be configured to be identical or similar to the communication node 200 shown in FIG. 2. For example, the transceiver 230 of the second communication node may be configured as follows.

Figure 5A:
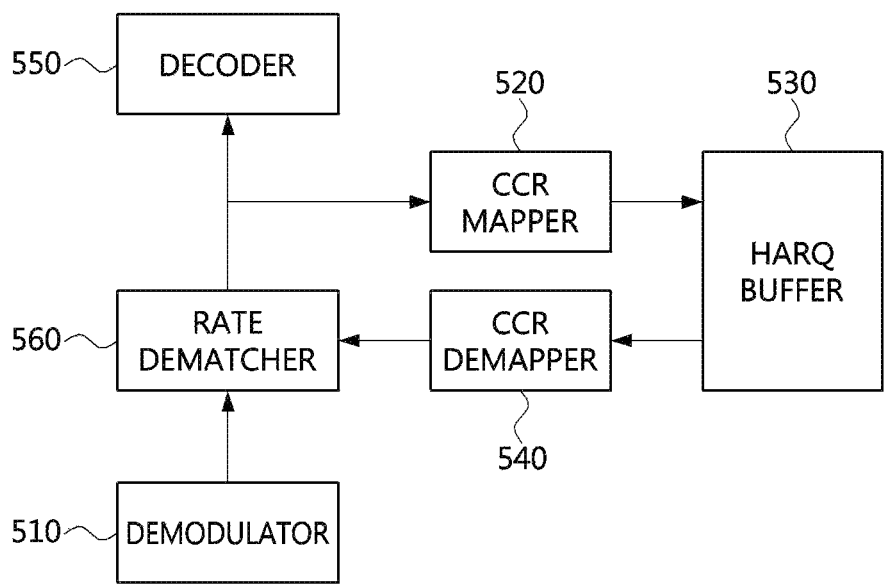
FIG. 5A is a block diagram showing a second example embodiment of a communication node constituting a communication system.
Figure 5B:
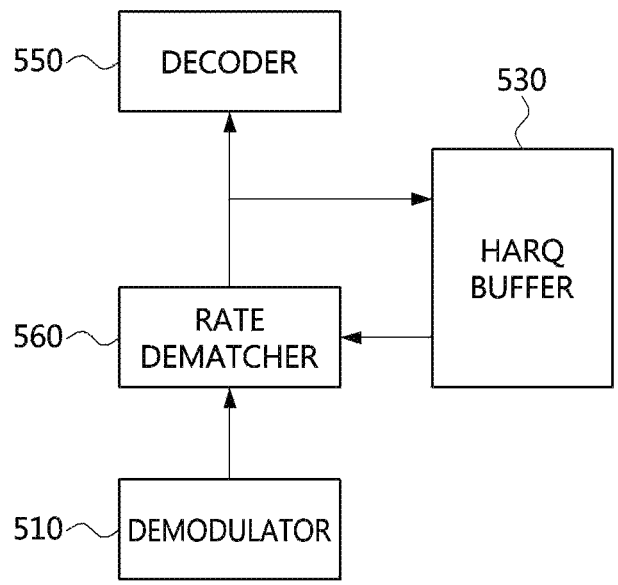
FIG. 5B is a block diagram showing a third example embodiment of a communication node constituting a communication system.

FIG. 5A is a block diagram showing a second example embodiment of a communication node constituting a communication system, and FIG. 5B is a block diagram showing a third example embodiment of a communication node constituting a communication system.

Referring to FIG. 5A, a communication node 500 (e.g., a transceiver device of the communication node 500) may include a demodulator 510, a coherent channel region (CCR) mapper 520, a HARQ buffer 530, a CCR demapper 540, a decoder 550, a rate dematcher (or a rate combiner) 560, and the like. Meanwhile, referring to FIG. 5B, a communication node 500 (e.g., a transceiver device of the communication node 500) may include a demodulator 510, a HARQ buffer 530, a decoder 550, a rate dematcher 560, and the like. The example embodiment shown in FIG. 3 may be performed by the communication node 500 including the components shown in FIG. 5B, and the example embodiment shown in FIG. 4 may be performed by the communication node 500 including the components shown in FIG. 5A. An operating method of the communication node 500 including the components shown in FIG. 5A will be described below.

The demodulator 510 may perform a demodulation operation on a received signal and generate original soft bit values (e.g., LLRs) of the demodulated signal. Alternatively, the original soft bit values may be generated by a soft bit generator (not shown) separately configured from the demodulator 510.

The CCR mapper 520 may set CCRs which are sets of resources having similar channel characteristics and determine one or more representative soft bit values in one CCR on the basis of the original soft bit values. Also, the CCR mapper 520 may determine a sign sequence of the original soft bit values. The HARQ buffer 530 may store representative soft bit values and the sign sequence. The CCR demapper 540 may restore one or more soft bit values on the basis of the representative soft bit values and the sign sequence stored in the HARQ buffer 530. The decoder 550 may perform a decoding operation on combined soft bit values.

Referring back to FIG. 4, the second communication node may receive a signal from the first communication node (S401). The demodulator 510 of the second communication node may generate demodulated symbols by performing a demodulation operation of the signal (e.g., a codeword) received from the first communication node (S402). Also, the demodulator 510 of the second communication node may generate original soft bit values of the individual demodulated symbols (S403). Alternatively, the operation of generating the original soft bit values may be performed by the soft bit generator rather than the demodulator 510. Here, the original soft bit values may be represented as original LLRs.

The rate dematcher 560 of the second communication node may acquire the original soft bit values from the demodulator 510. When the signal received in operation S401 is a retransmission signal (i.e., when the signal received in operation S401 is not an initial transmission signal), the CCR demapper 540 may generate restored soft bit values on the basis of information stored in a HARQ buffer (e.g., representative soft bit values and a sign sequence of a previously received signal) (S404). The CCR demapper 540 may transfer the restored soft bit values to the demodulator 510. On the other hand, when the signal received in operation S401 is an initial transmission signal, the CCR demapper 540 may transfer a default value (i.e., 0) rather than the restored soft bit values to the demodulator 510.

The rate dematcher 560 of the second communication node may generate combined soft bit values on the basis of the values received from the demodulator 510 (S405). For example, when the signal received in operation S401 is an initial transmission signal, the rate dematcher 560 may generate combined soft bit values on the basis of the original soft bit values acquired from the demodulator 510 (or the original soft bit values and a default value). Here, the original soft bit values are rate-dematched with the default value so that the combined soft bit values may be generated. On the other hand, when the signal received in operation S401 is a retransmission signal, the rate dematcher 560 of the second communication node may generate combined soft bit values on the basis of the original soft bit values and the restored soft bit values acquired from the demodulator 510. Here, the original soft bit values are rate-dematched with the restored soft bit values so that the combined soft bit values may be generated. In other words, the combined soft bit values may be values obtained by combining soft bit values of the initial transmission signal to a currently received retransmission signal. The CCR mapper 520 of the second communication node may acquire the combined soft bit values from the rate dematcher 450 of the second communication node. The sequence of the combined soft bit values acquired from the rate dematcher 560 of the second communication node is a data mapping sequence. Therefore, when the combined soft bit values are not arranged in units of CCRs, the CCR mapper 520 of the second communication node may arrange the combined soft bit values in a CCR mapping sequence.

In general, data mapping may be performed according to a preset mapping sequence (e.g., frequency-first mapping (data is allocated to frequency resources→data is allocated to time resources)). For example, when two-dimensional (2D) resources set as a CCR are composed of 4×3 resource elements (REs), data of a first symbol among three symbols constituting the CCR may be mapped to frequency resources in a direction in which the frequency increases. When data mapping in the first symbol is finished, data of a second symbol among the three symbols may be mapped to frequency resources in the direction in which the frequency increases. When data mapping in the second symbol is finished, data of a third symbol among the three symbols may be mapped to frequency resources in the direction in which the frequency increases. To configure data in a CCR mapping sequence, combined soft bits $e^{(j)(r)}$ which are an output of the rate dematcher 560 may be reconfigured first in a resource group (RG) form (S406). In other words, the combined soft bits are positioned at REs which are mapped to soft bits so that an RG form for the combine soft bits may be reconfigured. The combined soft bits which are reconfigured in an RG form (e.g., combined soft bit values) may be represented as "$e_{RG}^{(j)(r)}(l, m, b, q)$." Here, l is a layer number, m is a frequency number, n is a time number, and q is a bit number of a modulation order. A CCR size may be determined with a predefined frequency bandwidth and time range on the basis of the reconfigured combined soft bits, and the position of a start point of a CCR boundary may be determined on the basis of a frequency position offset and a time position offset of a CCR. When CCRs are set in this way, signals belonging to the CCRs may be rearranged to neighbor each other so that the signals may be processed in units of set CCRs. In other words, the combined soft bit values reconfigured in an RG form may be rearranged in a CCR mapping sequence (S410). The combined soft bits (e.g., combined soft bit values) rearranged in a CCR mapping sequence may be represented as "$e_{CCR}^{(j)(r)}(l, u, p, q)$." Here, u is a CCR number, and p is the number of a data RE belonging to a $u^{th}$ CCR. To determine one or more representative soft bit values of a CCR, the CCR mapper 520 of the second communication node may set one or more CCRs in a TB.

Figure 6A:
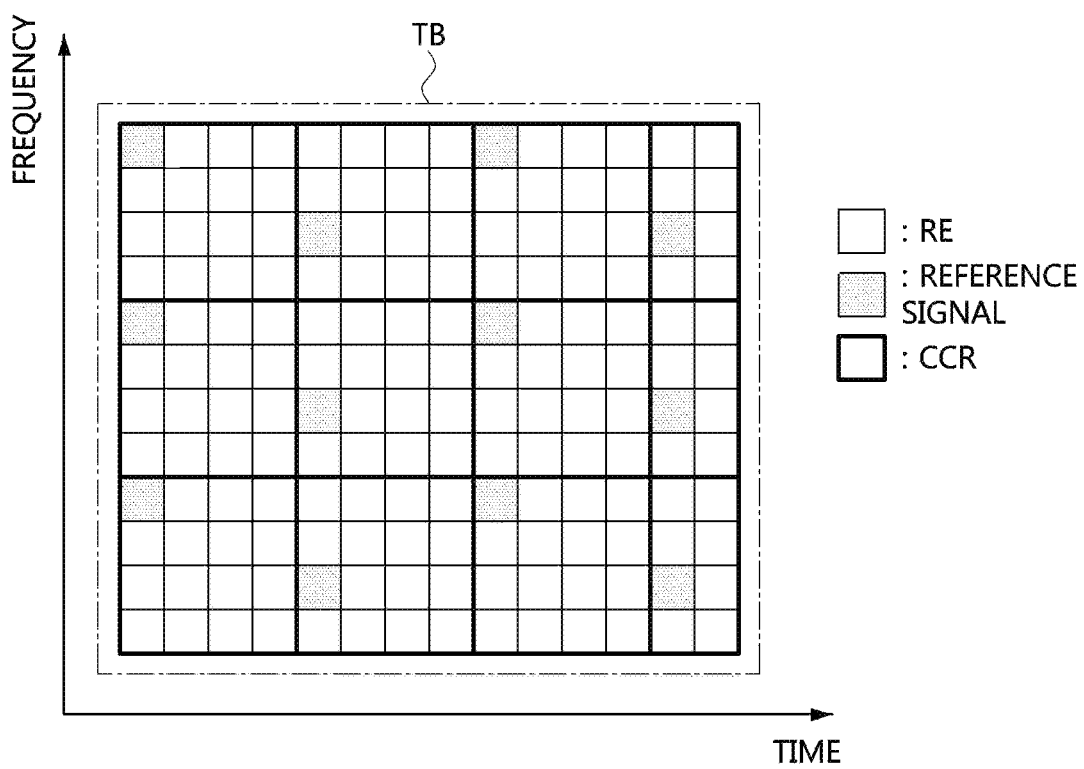
FIG. 6A is a conceptual diagram showing a first example embodiment of a coherent channel region (CCR) configuration in a communication system.

FIG. 6A is a conceptual diagram showing a first example embodiment of a CCR configuration in a communication system.

Referring to FIG. 6A, a TB may be divided into one or more CCRs. A CCR may be a set of consecutive REs having similar channel characteristics. Since consecutive REs belonging to a CCR have similar channel characteristics, sizes of soft bit values of symbols received through the consecutive REs belonging to the CCR may be identical or similar. A CCR may be generally set within a narrow band compared to all signals, and the narrow band may approximate to an additive white Gaussian noise (AWGN) channel. Therefore, channel characteristics in a CCR may be estimated to be flat. This is the reason that channel characteristics are similar in a CCR.

A CCR size may be determined on the basis of soft bit values mapped to the RG. For example, consecutive REs in which sizes of soft bit values are changed within a preset range may be set to a CCR among REs belonging to the TB. In this case, a difference between sizes of soft bit values of symbols received through REs which neighbor each other on a CCR boundary may be a predefined threshold value or higher.

Also, a CCR size may be determined by Equation 11 below. In other words, a region in the RG in which $R_{xx}$ (autocorrelation) of Equation 11 below is a predefined threshold value or higher may be defined as a CCR. For reference, a range which satisfies a condition that $R_{xx}$ (autocorrelation) of Equation 11 below be a predefined threshold value or higher is observed in an RG, and an interval between reference signals (RSs) may be determined in the standard on the basis of the observed range. Therefore, a CCR may be set on the basis of RSs (e.g., demodulation RSs (DM-RSs)). In this case, a frequency region and a time region of the CCR may be determined on the basis of an interval between RSs on a frequency axis. For example, the frequency bandwidth of the CCR may be an interval between RSs on the frequency axis, and a time range of the CCR may be an interval between RSs on a time axis. For reference, a CCR size does not have to be identical to an RS interval.

In the present invention, REs are used as the concept of channel use. In other words, one RE may be considered as use of one channel. Also, an RG may be considered as a set of REs. Therefore, dimensions of an RG and resources constituting the corresponding dimensions vary according to how channel use is configured. In general, there is no limitation in a method of configuring channel use. In other words, channel use is defined in connection with neither specific dimensions nor specific resources only.

Therefore, a method of configuring REs is changed so that one-dimensional (1D) RG may be configured with only one of frequency resources and time resources, or a three-dimensional (3D) RG may be configured by adding spatial resources to frequency and time resources. Consequently, an RG may be configured with any dimensions.

Also, resources constituting RG dimensions may be selected without limit according to circumstances. In the present invention, for convenience of description, frequency and time are taken as examples of resources corresponding to individual dimensions. However, any dimensions may be selected according to various usable resources such as frequency, time, phase, the number of antennas, and space.

In the present invention, for convenience of description, a 2D RG is configured, and frequency and time resources are taken as examples of resources constituting the 2D RG. However, the present invention is not limited to the 2D RG (frequency and time resources) only. The present invention does not only work for specific dimensions but may also be applied to an RG having any configuration.

A CCR position offset value may be determined by Equation 12. In other words, all over an RG, a CCR position offset value may be determined so that a distance in the RG between an RE to which data may be mapped and an RS closest to the RE may be minimized.

$$R = E\{|e_{RG}^{(j)(r)}(l, m, n, q)| \cdot |e_{RG}^{(j)(r)}(l, m', n', q)|\}:$$ [Equation 11]

Autocorrelation of $e_{RG}^{(j)(r)}$ $$(m_{offset}, n_{offset}) = \underset{m_{offset}, n_{offset}}{\mathrm{argmax}} \ (D_{DATA,RE-RS})\}:$$ [Equation 12]

min. distance between data & RS

Here, W representative sizes of soft bit values may be derived from each CCR.

Figure 6B:
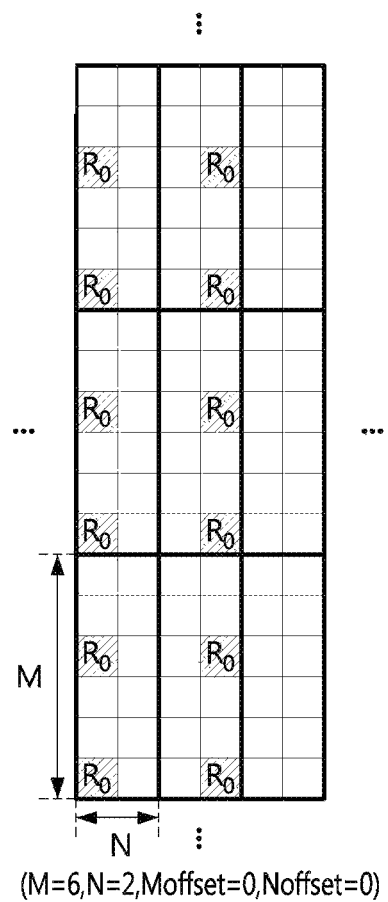
FIG. 6B is a conceptual diagram showing a second example embodiment of a CCR configuration in a communication system.
Figure 6C:
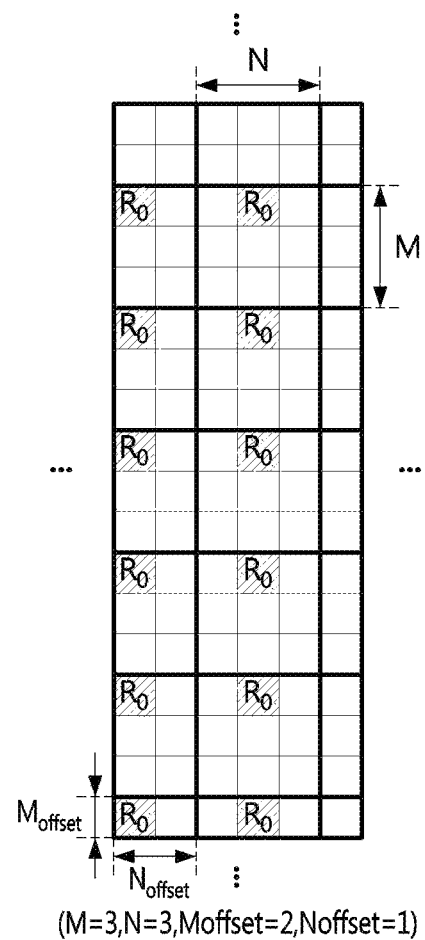
FIG. 6C is a conceptual diagram showing a third example embodiment of a CCR configuration in a communication system.

FIG. 6B is a conceptual diagram showing a second example embodiment of a CCR configuration in a communication system, and FIG. 6C is a conceptual diagram showing a third example embodiment of a CCR configuration in a communication system.

In FIG. 6B, a CCR may be composed of 6×2 REs, and $m_{offset}$ and $n_{offset}$ may be 0. In FIG. 6C, a CCR may be composed of 3×3 REs, and a $m_{offset}$ and a $n_{offset}$ may be 2 and 1, respectively.

Referring back to FIG. 4, the CCR mapper 520 of the second communication node may set one or more CCRs on the basis of RSs or soft bit values. When one CCR is composed of M subcarriers on the frequency axis and composed of N symbols on the time axis and S REs to which data is not able to be mapped exist in the CCR, PQ soft bits may be generated from symbols mapped to P REs in the CCR. Q may indicate the number of bits per symbol according to a modulation scheme and may be defined according to Table 1 below. In this case, W representative sizes of soft bit values may be stored per CCR. When there is no specific condition, it is simplest to run the procedure with W=Q.

$P=MN-S$): # of RE for data in 1 CCR $Q=Q_m$ [Equation 13]

TABLE 1

| MODULATION SCHEME | $Q_m$ |
|---|---|
| BPSK | 1 |
| QPSK | 2 |
| 16QAM | 4 |
| 64QAM | 6 |

When characteristics of soft bit values between I and Q are identical or similar, it is possible to reduce W to half using the identical or similar characteristics. In other words, assuming that there are W representative sizes of soft bit values per CCR when the characteristics are not used, soft bit values may be classified into W/2 representative sizes of soft bit values (groups) when the characteristics are used. For example, it is assumed that W=Q when the characteristics are not used. When 16 quadrature amplitude modulation (16QAM) is used in communication between the first communication node and the second communication node, sizes of soft bit values in one CCR may be classified into two groups using the characteristics. Likewise, when 64QAM is used in communication between the first communication node and the second communication node, sizes of soft bit values in one CCR may be classified into three groups. In this case, W=Q/2 representative sizes of soft bit values may be stored per CCR.

In a CCR, W soft bit size groups may be represented by expressions based on any one group. In this case, a group expression showing a size relationship with the reference group may be defined for each group. Also, it is unnecessary to store all the W groups, and W=1 representative size of soft bit values may be stored per CCR. At this time, it is necessary to additionally store (W−1) group expressions which show relationships between the reference group and (W−1) groups which are not the reference group. For example assuming that W=3 and representative sizes of soft bit values are 1, 2, and 3, a representative soft bit value of the reference group may be set to 1, and size relationships between 1 which is the representative soft bit value of the reference group and 2 and 3 which are representative soft bit values of the other groups may be represented by expressions. Therefore, when the group expressions of the other groups are stored, it is unnecessary to store the representative sizes of soft bit values of the other groups.

For convenience of description, it has been assumed above that there is one reference group. In general, however, there may be a plurality of reference groups. Therefore, when Y referential representative sizes of soft bit values are set in a CCR, W representative sizes of soft bit values may be represented with (W−Y) group expressions. Additionally, when such a group expression varies according to each CCR, Y referential representative sizes of soft bit values and (W−Y) group expressions are stored per CCR. Therefore, it is necessary to calculate gains in comparison with a method of storing W referential representative soft bit values. On the other hand, when a group expression does not vary according to each CCR, it is unnecessary to store a group expression per CCR, and thus it is possible to reduce memory in comparison with the method of storing W representative sizes of soft bit values per CCR. When CCR setting is finished, the CCR mapper 520 of the second communication node may set one or more representative soft bit values and a sign sequence of a CCR (S407). Representative soft bit values may be set as follows.

FIG. 7 is a conceptual diagram showing a first example embodiment of a method of setting representative soft bit values.

Referring to FIG. 7, the CCR mapper 520 of the second communication node may calculate an absolute combined soft bit value (e.g., an absolute combined LLR value) (S407-1). For example, an LLR set to +71 may indicate that, when the base of logarithm is b, a likelihood of the corresponding bit being 1 is greater than a likelihood of the corresponding bit being 0 by $b^{71}$, and an LLR set to −71 may indicate that a likelihood of the corresponding bit being 0 is greater than a likelihood of the corresponding bit being 1 by $b^{71}$. The CCR mapper 520 of the second communication node may determine W (W≥1) representative sizes of soft bit values (e.g., representative LLR sizes) per CCR on the basis of the absolute combined soft bit value (e.g., an absolute combined LLR size) (S407-2). For example, when a CCR is composed of one group, W may be defined to be 1, and one representative size of soft bit values (e.g., a representative LLR size) may be determined. When a CCR is composed of two or more groups, a representative size of soft bit values (e.g., a representative LLR size) of each group may be determined. For example, the CCR mapper 520 of the second communication node may determine one absolute combined soft bit value (e.g., an absolute combined LLR value) among absolute combined soft bit values (e.g., absolute combined LLR values) as a representative size of soft bit values (e.g., a representative LLR size) of a CCR. Alternatively, the CCR mapper 520 of the second communication node may determine an expectation or a sample mean of absolute combined soft bit values (e.g., absolute combined LLR values) as a representative size of soft bit values (e.g., a representative LLR size) of a CCR. A representative LLR size of a CCR may be determined to be 70. In other words, a representative size of soft bit values may indicate 70.

Also, the CCR mapper 520 of the second communication node may determine a sign sequence of combined soft bit values (e.g., original LLRs) (S407-3). When the sign "+" is set to 0 and the sign "−" is set to 1, the sign sequence of the original soft bit values (e.g., the original LLRs) may be "0010 1001 1100 0010."

Referring back to FIG. 4, the CCR mapper 520 of the second communication node may store representative soft bit values and sign sequences in the HARQ buffer 530 of the second communication node (S408). For example, when a representative size of soft bit values determined in FIG. 7 is four bits and a sign sequence determined in FIG. 7 is "00101 1001 1100 0010," the minimum size of the HARQ buffer 530 required for the single CCR may be 20 bits. On the other hand, according to an existing method, all original soft bits of symbols mapped to 16 REs are stored in the HARQ buffer 530, and thus the minimum size of the HARQ buffer 530 required for the single CCR may be 64 bits (i.e., 16×4 bits).

In other words, a ratio of the size of the HARQ buffer 530 required for example embodiments of the present invention to the size of the HARQ buffer 530 required for the existing method may be determined by Equation 14 and Equation 15 below.

$$\overline{e_{CCR}^{(j)(r)}(l,u,w)} = \underset{CCR}{E}\{|e_{CCR}^{(j)(r)}(l,u,p,q)|\}: \quad \text{[Equation 14]}$$

$$\text{mean of } e_{CCR}^{(j)(r)}(l,u,p,q) \text{ over 1 CCR}$$

$$\overrightarrow{e_{CCR}^{(j)(r)}(l,u,p,q)} = \text{sign}(e_{CCR}^{(j)(r)}(l,u,p,q)):$$

$$\text{sign of } e_{CCR}^{(j)(r)}(l,u,p,q) \text{ over 1 CCR}$$

$$R_{\Delta G} = \frac{\max(G_{CCR})}{\max(G_{conv})} = \frac{WB_{soft} + PQ_m}{PQ_m B_{soft}} = \quad \text{[Equation 15]}$$

$$\begin{cases} \dfrac{WB_{soft} + PQ_m}{PQ_m B_{soft}} = \dfrac{\left(\frac{W}{Q_m}\right)B_{soft} + (MN-S)}{(MN-S)B_{soft}} & \text{general } CCR \\[6pt] \dfrac{Q_m B_{soft} + PQ_m}{PQ_m B_{soft}} = \dfrac{B_{soft} + (MN-S)}{(MN-S)B_{soft}} & \text{if } W = Q_m \\[6pt] \dfrac{\frac{Q_m}{2}B_{soft} + PQ_m}{PQ_m B_{soft}} = \dfrac{\frac{B_{soft}}{2} + (MN-S)}{(MN-S)B_{soft}} & \text{if } W = \frac{Q_m}{2} \\[6pt] \dfrac{(1)B_{soft} + PQ_m}{PQ_m B_{soft}} = \dfrac{\frac{B_{soft}}{Q_m} + (MN-S)}{(MN-S)B_{soft}} & \text{if } W = 1 \end{cases}$$

$G_{CCR}$ may indicate a HARQ buffer size required for example embodiments of the present invention, and $G_{CONV}$ may indicate a HARQ buffer size required for the existing method. When appropriate values are put into Equation 15, results may be acquired as shown in Equation 16 below. Equation 16 is calculated when W=Q/2. Referring to Equation 16, it is possible to see that a HARQ buffer may be configured in a smaller size than that of the existing method using channel coherency.

$$R_{\Delta G} = \begin{cases} \dfrac{4/2 + (6*3-1)}{4(6*3-1)} = 0.279 & \begin{array}{l} B_{soft} = 4, M = 6, \\ N = 3, S = 1 \end{array} \\[6pt] \dfrac{6/2 + (6*3-1)}{6(6*3-1)} = 0.196 & \begin{array}{l} B_{soft} = 6, M = 6, \\ N = 3, S = 1 \end{array} \\[6pt] \dfrac{4/2 + (12*6-4)}{4(12*6-4)} = 0.257 & \begin{array}{l} B_{soft} = 4, M = 12, \\ N = 6, S = 4 \end{array} \\[6pt] \dfrac{6/2 + (12*6-4)}{6(12*6-4)} = 0.174 & \begin{array}{l} B_{soft} = 6, M = 12, \\ N = 6, S = 4 \end{array} \end{cases} \quad \text{[Equation 16]}$$

Meanwhile, the CCR demapper 540 of the second communication node may acquire CCR-specific representative soft bit values and sign sequences from the HARQ buffer 530 of the second communication node and restore CCR-specific soft bit values on the basis of the representative soft bit values and sign sequences (S409). Restored soft bit values may be as follows.

Figure 8:
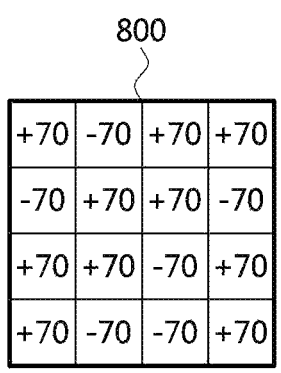
FIG. 8 is a conceptual diagram showing a first example embodiment of CCRs in which restored log likelihood ratios (LLRs) are shown.

FIG. 8 is a conceptual diagram showing a first example embodiment of CCRs in which restored LLRs are shown.

Referring to FIG. 8, when a representative LLR is 70 determined in FIG. 7 and a sign sequence is "0010 1001 1100 0010" determined in FIG. 7, CCRs in which restored LLRs are shown may be configured as indicated by 800.

For reference, in FIG. 8, the representative soft bit value of a CCR is applied to all CCRs as it is. Unlike this, assuming that the representative soft bit value is a value at a specific point in a CCR, restored soft bit values may be output by interpolating REs to which the representative soft bit value is designated.

Referring back to FIG. 4, since the sequence of restored soft bit values is a CCR mapping sequence, when the CCR mapping sequence differs from a data mapping sequence, the CCR demapper 540 of the second communication node may arrange the restored soft bit values in the data mapping sequence (S410).

Meanwhile, the decoder 550 of the second communication node may acquire the combined soft bit values from the rate dematcher 560 of the second communication node and perform a decoding operation on the acquired combined soft bit values (S411). The decoder 550 of the second communication node may generate a HARQ response according to the decoding result. When decoding of the signal received in operation S401 succeeds, the second communication node may transmit an ACK to the first communication node as a HARQ response to the signal (S412). On the other hand, when decoding of the signal received in operation S401 fails, the second communication node may transmit a NACK to the first communication node as a HARQ response to the signal (S412).

The first communication node may receive the HARQ response from the second communication node. The first communication node which has received the ACK may determine that the signal has been successfully received by the second communication node. On the other hand, the first communication node which has received the NACK may determine that the signal has not been successfully received by the second communication node and may perform a signal retransmission procedure.

According to the present invention, original soft bit values may be acquired from a demodulator of a receiver, and it is possible to acquire combined soft bit values by combining the original soft bit values and soft bit values restored on the basis of data stored in a HARQ buffer. CCRs are set by mapping the combined soft bit values to an RG, and W representative soft bit values and a sign sequence having a length of P×Q are stored in a HARQ buffer regarding P×Q combined soft bit values in each CCR so that a HARQ buffer size may be reduced. Therefore, it is possible to satisfy the requirements of high data throughput, low latency, and high reliability. Consequently, performance of a communication system may be improved.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A first communication node in a communication system, the first communication node comprising:
   a coherent channel region (CCR) mapper configured to determine W representative soft bit values based on X original soft bit values of a signal received from a second communication node and determine a sign sequence of the X original soft bit values;
   a hybrid automatic repeat request (HARQ) buffer configured to store the W representative soft bit values and the sign sequence determined by the CCR mapper; and
   a CCR demapper configured to generate X restored soft bit values using the W representative soft bit values and the sign sequence stored in the HARQ buffer,
   wherein each of X and W is an integer greater than or equal to 1.

2. The first communication node of claim 1, wherein absolute values of the X restored soft bit values are identical to the W representative soft bit values.

3. The first communication node of claim 1, wherein the CCR mapper arranges the X original soft bit values in a CCR mapping sequence.

4. The first communication node of claim 1, wherein the CCR demapper arranges the X restored soft bit values in a data mapping sequence.

5. The first communication node of claim 1, wherein the X original soft bit values are original soft bit values of symbols received through a CCR composed of resource elements (REs), and
   the CCR includes the REs whose channel characteristic is changed within a predefined range.

6. The first communication node of claim 5, wherein a region of the CCR is determined based on an interval between reference signals.

7. The first communication node of claim 5, wherein a difference between sizes of original soft bit values of symbols received through REs which neighbor each other on a boundary of the CCR is a predefined threshold value or higher.

8. The first communication node of claim 5, wherein the CCR is composed of REs to which symbols having soft bit values having an autocorrelation value of a predefined threshold value or higher are mapped.

9. The first communication node of claim 5, wherein when the W representative soft bit values are values for specific REs constituting the CCR, the X restored soft bit values are generated by performing an interpolation operation on the specific REs.

10. The first communication node of claim 5, wherein an offset of the CCR is determined based on distances between REs to which data is able to be mapped and reference signals.

11. The first communication node of claim 1, wherein when one or more of the W representative soft bit values are stored in the HARQ buffer, a group expression indicating a relationship between the one or more representative soft bit values and the W representative soft bit values except for the one or more representative soft bit values stored in the HARQ buffer is stored.

12. An operating method of a first communication node in a communication system, the method comprising:
   determining W representative soft bit values based on X original soft bit values of signals received from a second communication node;
   determining a sign sequence of the X original soft bit values; and generating X restored soft bit values using the W representative soft bit values and the sign sequence
wherein each of X and W is an integer greater than or equal to 1.

13. The method of claim 12, wherein absolute values of the X restored soft bit values are identical to the W representative soft bit values.

14. The method of claim 12, wherein the X original soft bit values are arranged in a coherent channel region (CCR) mapping sequence.

15. The method of claim 12, wherein the X restored soft bit values are arranged in a data mapping sequence.

16. The method of claim 12, wherein the X original soft bit values are original soft bit values of symbols received through a CCR composed of resource elements (REs), and
the CCR includes the REs whose channel characteristic is changed within a predefined range.

17. The method of claim 16, wherein a region of the CCR is determined based on an interval between reference signals.

18. The method of claim 16, wherein a difference between sizes of original soft bit values of symbols received through REs which neighbor each other on a boundary of the CCR is a predefined threshold value or higher.

19. The method of claim 16, wherein the CCR is composed of REs to which symbols having soft bit values having an autocorrelation value of a predefined threshold value or higher are mapped.

20. The method of claim 16, wherein when the W representative soft bit values are values for specific REs constituting the CCR, the X restored soft bit values are generated by performing an interpolation operation on the specific REs.

* * * * *